(12) United States Patent
Gentry

(10) Patent No.: US 10,899,436 B2
(45) Date of Patent: *Jan. 26, 2021

(54) ADJUSTABLE LANDING GEAR ASSEMBLY FOR UNMANNED AERIAL VEHICLES

(71) Applicant: Amazon Technologies, Inc., Seattle, WA (US)

(72) Inventor: Nicholas Kristofer Gentry, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 229 days.

This patent is subject to a terminal disclaimer.

(21) Appl. No.: 15/422,105

(22) Filed: Feb. 1, 2017

(65) Prior Publication Data

US 2017/0137118 A1    May 18, 2017

Related U.S. Application Data

(63) Continuation of application No. 14/661,955, filed on Mar. 18, 2015, now Pat. No. 9,592,908.

(51) Int. Cl.
*B64C 25/00* (2006.01)
*B64C 25/32* (2006.01)
(Continued)

(52) U.S. Cl.
CPC ............ *B64C 25/001* (2013.01); *B64C 25/10* (2013.01); *B64C 25/18* (2013.01); *B64C 25/24* (2013.01);
(Continued)

(58) Field of Classification Search
CPC ....... B64C 25/001; B64C 25/18; B64C 25/52; B64C 25/10; B64C 25/24
See application file for complete search history.

(56) References Cited

U.S. PATENT DOCUMENTS 2,927,747 A * 3/1960 Bennie .................... B64C 25/52
244/17.17
3,191,316 A * 6/1965 Dryden ............... B64C 29/0041
244/23 A
(Continued)

FOREIGN PATENT DOCUMENTS

CN         201158456       12/2008
CN         104190088 A     12/2014
(Continued)

OTHER PUBLICATIONS

Search Report dated Jul. 25, 2019, for corresponding CN Application No. 201680016396.6.
(Continued)

*Primary Examiner* — Justin M Benedik
(74) *Attorney, Agent, or Firm* — Athorus, PLLC

(57) ABSTRACT

This disclosure describes a configuration of an unmanned aerial vehicle (UAV) landing gear assembly that includes adjustable landing gear extension that may be extended or contracted so that the body of the UAV is contained in a horizontal plane when the UAV is landed, even on sloping surfaces. For example, when a UAV is landing, the slope of the surface may be determined and the landing gear extensions adjusted based on the slope so that the body of the UAV remains approximately horizontal when the UAV lands and is supported by the landing gear extensions.

19 Claims, 13 Drawing Sheets

(51) Int. Cl.
  *B64C 39/02* (2006.01)
  *B64C 25/10* (2006.01)
  *B64C 25/24* (2006.01)
  *B64C 25/52* (2006.01)
  *G05D 1/10* (2006.01)
  *B64C 25/18* (2006.01)
  *B64D 1/02* (2006.01)

(52) U.S. Cl.
  CPC .............. *B64C 25/32* (2013.01); *B64C 25/52* (2013.01); *B64C 39/024* (2013.01); *B64D 1/02* (2013.01); *G05D 1/102* (2013.01); *B64C 2025/008* (2013.01); *B64C 2201/027* (2013.01); *B64C 2201/128* (2013.01); *B64C 2201/18* (2013.01); *B64C 2201/187* (2013.01)

(56) References Cited

U.S. PATENT DOCUMENTS

| | | | | |
|---|---|---|---|---|
| 4,062,507 | A * | 12/1977 | Felder | B64C 25/00 244/104 FP |
| 6,922,610 | B2 * | 7/2005 | Okamoto | B25J 9/06 219/121.74 |
| 9,033,276 | B1 * | 5/2015 | Calvert | B64C 25/10 244/102 R |
| 2002/0060267 | A1 | 5/2002 | Yavnai | |
| 2007/0012818 | A1 | 1/2007 | Miyazawa et al. | |
| 2007/0221783 | A1 * | 9/2007 | Parks | G06Q 30/08 244/102 A |
| 2009/0250549 | A1 | 10/2009 | Wiggerich | |
| 2010/0021288 | A1 | 1/2010 | Collette | |
| 2012/0298796 | A1 * | 11/2012 | Carreker | B64G 1/22 244/100 R |
| 2013/0206915 | A1 * | 8/2013 | Desaulniers | B64C 39/024 244/165 |
| 2017/0144756 | A1 * | 5/2017 | Rastgaar Aagaah | B64C 39/024 |

FOREIGN PATENT DOCUMENTS

| | | |
|---|---|---|
| CN | 204161620 U | 2/2015 |
| JP | H06254780 A | 9/1994 |
| JP | H1159595 A | 3/1999 |
| JP | 115896 A | 4/1999 |
| JP | 2002200990 A | 7/2002 |
| JP | 2004130927 A | 4/2004 |
| JP | 2009541121 A | 11/2009 |
| JP | 2010023825 A | 2/2010 |
| KR | 20010103221 A | 11/2001 |
| WO | 2011096942 A1 | 8/2011 |
| WO | 2014055269 A1 | 4/2014 |

OTHER PUBLICATIONS

International Search Report and Written Opinion for PCT Application No. PCT/US2016/022959 dated Jun. 28, 2016.
Search Report dated Mar. 9, 2020, for corresponding CN Application No. 201680016396.6.

* cited by examiner

ADJUSTABLE LANDING GEAR ASSEMBLY FOR UNMANNED AERIAL VEHICLES

CROSS-REFERENCE TO RELATED APPLICATION

This application claims priority to U.S. application Ser. No. 14/661,955, filed Mar. 18, 2015, entitled "Adjustable Landing Gear Assembly for Unmanned Aerial Vehicles," which is incorporated herein by reference in its entirety.

BACKGROUND

Unmanned aerial vehicles ("UAV"), such as propeller based aerial vehicles (e.g., quad-copters, octo-copters) are becoming more common. Many UAVs include a navigation or flight control system that is used to control the flight and navigation of the UAV. For proper operation, it is desirable that the navigation or flight control system be calibrated when the UAV is horizontal.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
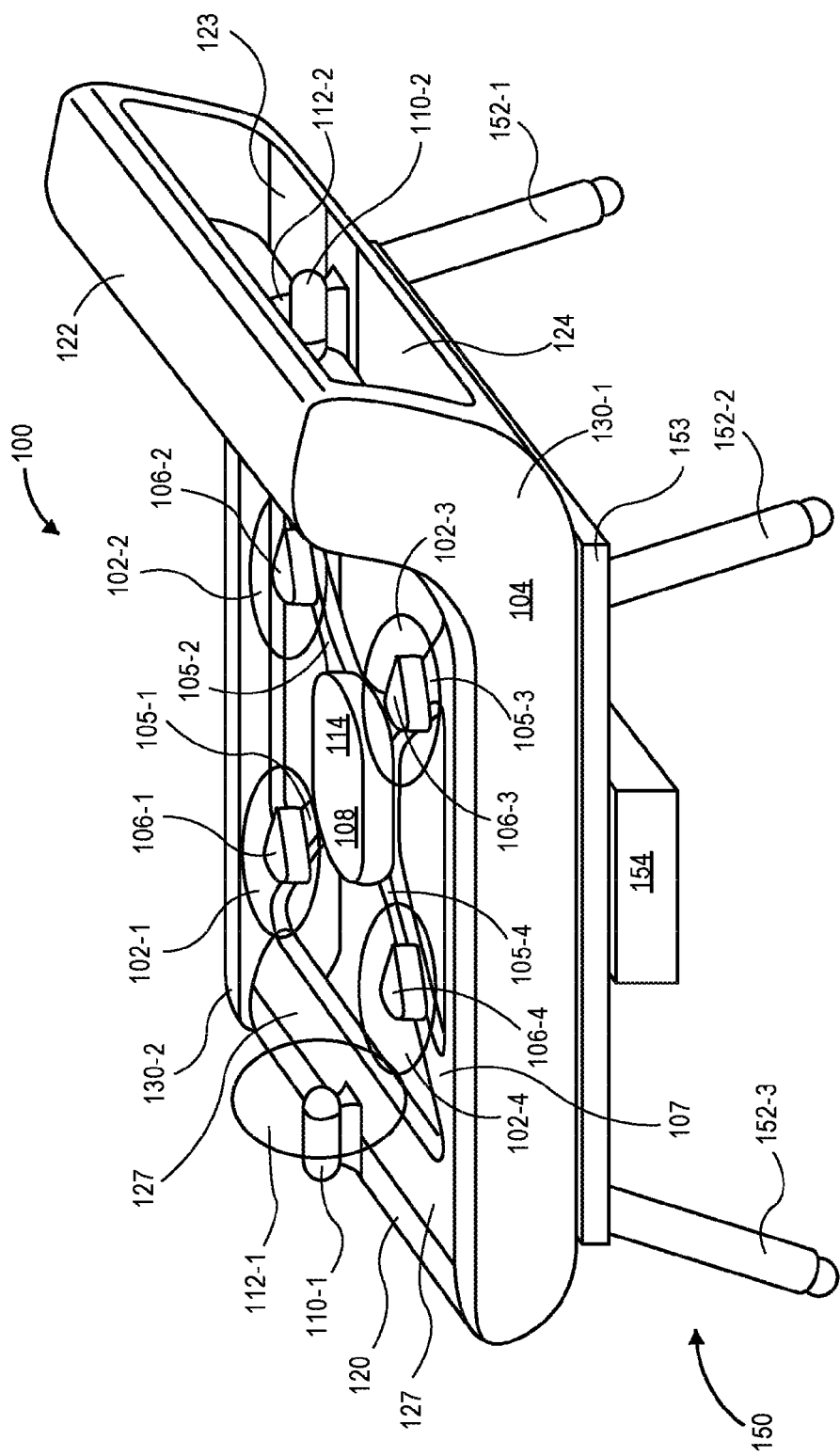
FIG. 1 depicts a view of an unmanned aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes an adjustable landing gear assembly for an unmanned aerial vehicle ("UAV") that enables landing of the UAV on an uneven and/or sloping surface, and safe delivery of fragile items. The landing gear assembly includes adjustable landing gear extensions that contact a surface and support a UAV when landed. The landing gear extensions may each be individually adjusted horizontally with respect to the UAV. Likewise, each of the landing gear extensions may be adjusted by extending or contracting the landing gear extension and/or changing the angle of the landing gear extension. In one implementation, when a UAV is first powered on or otherwise activated, the angle of the body of the UAV may be adjusted so that the body of the UAV is contained in a horizontal place that is approximately perpendicular with respect to the gradient of the gravity field of earth. The angle of the body of the UAV may be adjusted by extending or contracting one or more of the landing gear extensions until the body of the UAV is horizontal. When the body of the UAV is determined to be horizontal, the navigation components of the UAV may be calibrated so that navigation and flight controls are performed with respect to horizontal and the UAV operates in an intended manner.

Likewise, when the UAV is landing, it may determine if the surface upon which it will land is sloping (not horizontal) or uneven. If the surface is sloping, the UAV may extend or contract one or more of the landing gear extensions so that the body of the UAV remains horizontal when landing is complete. Adjustment of the landing gear extensions may be done while the UAV is airborne, as part of the landing process and/or after the UAV has landed, as discussed further below.

The landing gear assembly may also operate as a landing dampener to absorb shock resulting from a landing of the UAV to enable safe delivery of fragile items. For example, when a UAV is landing, the landing gear extensions may be extended and configured to contract as the UAV lands, thereby absorbing forces caused by the landing of the UAV on a surface. In addition, once the UAV has landed, the landing gear extensions may be contracted until a payload carried by the UAV comes into contact with the surface, or within a defined distance of the surface. When the payload contacts the surface or is within the defined distance, the payload may be disengaged from the UAV.

In some implementations, the landing gear assembly may be configured to couple or decouple from a UAV and/or a variety of different configurations of UAVs. For example, the landing gear assembly may include a support coupling that mates with a receiver coupling that is attached to a body of an UAV. The support coupling may include electrical connections that provide power to the landing gear assembly, enable the UAV to control the landing gear assembly, and/or receive data from the landing gear assembly. In some implementations, the support coupling may be a rotatable member, such as a gimbal, that allows the body of a coupled UAV to rotate along at least one axis with respect to the landing gear assembly. For example, prior to liftoff a UAV may determine a desired heading of the UAV at liftoff, considering wind or other external forces, and re-orient the body of the UAV to correspond to the desired heading. Specifically, the UAV may be re-oriented while it is landed by rotating the support coupling so that the body of the UAV rotates while the landing gear assembly remains stationary.

The UAV may be any form of UAV that can be coupled to the landing gear assembly. The UAV may have any number of lifting motors and corresponding lifting propellers. For example, the UAV may include four lifting motors and lifting propellers (also known as a quad-copter), eight lifting motors and lifting propellers (also known as an octo-copter), etc. Likewise, to improve the efficiency of horizontal flight, the UAV may also include one or more wings, thrusting motors, etc., that are oriented to aid in horizontal flight of the UAV.

In some implementations, the body of the UAV may be formed of a single mold or uni-body design. To further improve the efficiency of the UAV, in some implementations, one or more components of the UAV may be formed of one or more lightweight materials, such as carbon fiber, graphite, machined aluminum, titanium, fiberglass, etc. Likewise, one or more components of the landing gear assembly may be formed of lightweight material. Regardless of the material, one or more of the components of the UAV and/or the landing gear assembly may be formed having a hollow inner cavity or may be formed around a lightweight core (e.g., foam, wood, plastic), thereby reducing weight, increasing structural rigidity and providing a channel through which one or more wires and/or cables may be passed and/or in which other components may be housed.

FIG. 1 illustrates a view of a UAV 100 that is coupled to a landing gear assembly 150, according to an implementation. As illustrated, the UAV 100 includes a perimeter frame 104. The perimeter frame 140 includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling of the components of the perimeter frame 140 may be with a corner junction. In such an example, the corner junctions are also part of the perimeter frame 104.

The components of the perimeter frame 104, such as the front wing 120, lower rear wing 124, upper rear wing 122, and side rails 130-1, 130-2 may be formed of any one or more suitable materials, such as graphite, carbon fiber, aluminum, titanium, etc., or any combination thereof. In the illustrated example, the components of the perimeter frame 104 of the UAV 100 are each formed of carbon fiber. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the UAV 100 when the UAV is moving in a direction that includes a horizontal component. For example, the wings may each have an airfoil shape that causes lift due to the airflow passing over the wings during horizontal flight.

Opposing ends of the front wing 120 may be coupled to a corner junction or the side rails 130. In some implementations, the front wing may include one or more flaps 127 or ailerons, that may be used to adjust the pitch, yaw, and/or roll of the UAV 100 alone or in combination with the lifting motors 106, lifting propellers 102, thrusting motors 110, thrusting propellers 112, and/or other flaps on the rear wings, discussed below. In some implementations, the flaps 127 may also be used as a protective shroud to further hinder access to the lifting propellers 102 by objects external to the UAV 100. For example, when the UAV 100 is moving in a vertical direction, landed, or hovering, the flaps 127 may be extended to increase the height of the protective barrier around a portion of the lifting propellers 102.

In some implementations, the front wing 120 may include two or more pairs of flaps 127. In other implementations, for example, if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the UAV 100 during flight.

Opposing ends of the lower rear wing 124 may be coupled to a corner junction or to the side rails 130. In some implementations, the lower rear wing may include one or more flaps 123 or ailerons, that may be used to adjust the pitch, yaw and/or roll of the UAV 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the UAV 100. For example, when the UAV 100 is moving in a vertical direction, landed, or hovering, the flaps 123 may be extended, similar to the extending of the front flaps 127 of the front wing 120.

In some implementations, the lower rear wing 124 may include two or more flaps 123. In other implementations, for example, if there is no rear thrusting motor 110-2 mounted to the lower rear wing, the lower rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction or to the side rails 130. In some implementations, like the lower rear wing, the upper rear wing 122 may include one or more flaps (not shown) or ailerons, that may be used to adjust the pitch, yaw and/or roll of the UAV 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the UAV 100. For example, when the UAV 100 is moving in a vertical direction, landed, or hovering, the flaps may be extended, similar to the extending of the front flaps 127 of the front wing 120 or the flaps 123 of the lower rear wing.

The front wing 120, lower rear wing 124, and upper rear wing 122 may be positioned and sized proportionally to provide stability to the UAV while the UAV 100 is moving in a direction that includes a horizontal component. For example, the lower rear wing 124 and the upper rear wing 122 are stacked vertically such that the vertical lift vectors generated by each of the lower rear wing 124 and upper rear wing 122 are close together. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In one implementation, the UAV 100 may be approximately 64.75 inches long from the front of the UAV 100 to the rear of the UAV 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The overall weight of the UAV 100 is approximately 50.00 pounds.

Coupled to the interior of the perimeter frame 104 is a central frame 107. The central frame 107 includes a hub 108 and motor arms that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at corner junctions. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the UAV 100 and any engaged payload, thereby enabling aerial transport of the payload.

Mounted to each lifting motor 106 is a lifting propeller 102. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-four inches. While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the UAV 100 may also include one or more thrusting motors 110 and corresponding thrusting propellers 112. The thrusting motors and thrusting propellers may be the same or different from the lifting motors 106 and lifting propellers 102. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the UAV 100 and utilized to increase the efficiency of flight that includes a horizontal component. For example, when the UAV 100 is traveling in a direction that includes a horizontal component, the thrusting motors may be engaged to provide a horizontal thrust force via the thrusting propellers to propel the UAV 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the UAV 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the UAV with two thrusting motors 110 and corresponding thrusting propellers 112, in other implementations, there may be fewer or additional thrusting motors and corresponding thrusting propellers. For example, in some implementations, the UAV 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the UAV 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104.

The perimeter frame 104 provides safety for objects foreign to the UAV 100 by inhibiting access to the lifting propellers 102 from the side of the UAV 100, provides protection to the UAV 100, and increases the structural integrity of the UAV 100. For example, if the UAV 100 is traveling horizontally and collides with a foreign object (e.g., wall, building), the impact between the UAV 100 and the foreign object will be with the perimeter frame 104, rather than a propeller. Likewise, because the frame is interconnected with the central frame 107, the forces from the impact are dissipated across both the perimeter frame 104 and the central frame 107.

The perimeter frame 104 also provides a surface upon which one or more components of the UAV 100 may be mounted. Alternatively, or in addition thereto, one or more components of the UAV may be mounted or positioned within the cavity of the portions of the perimeter frame 104. For example, one or more antennas may be mounted on or in the front wing 120. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, accelerometers, inclinometers, distance-determining elements, gimbals, Global Positioning System (GPS) receiver/transmitter, radars, illumination elements, speakers, and/or any other component of the UAV 100 or the UAV control system (discussed below), etc., may likewise be mounted to or in the perimeter frame 104. Likewise, identification or reflective identifiers may be mounted to the perimeter frame 104 to aid in the identification of the UAV 100.

In some implementations, the perimeter frame 104 may also include a permeable material (e.g., mesh, screen) that extends over the top and/or lower surface of the perimeter frame 104 enclosing the central frame, lifting motors, and/or lifting propellers.

A UAV control system 114 is also mounted to the central frame 107. In this example, the UAV control system 114 is mounted to the hub 108 and is enclosed in a protective barrier. The protective barrier may provide the control system 114 weather protection so that the UAV 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

The body of the UAV 100 may be coupled to a landing gear assembly 150 that supports the UAV 100 when landed on a surface. As discussed further below with respect to FIG. 2, the landing gear assembly 150 includes a main support base 153 and one or more landing gear extensions 152-1, 152-2, 152-3 that may be adjusted horizontally or extended/contracted to adjust the angle of the body of the UAV when landed. In some implementations, the landing gear assembly may also include a payload engagement mechanism (not shown). The payload engagement mechanism may be configured to engage and disengage a payload 154, such as items and/or containers that hold items.

Likewise, the UAV 100 includes one or more power modules (not shown) that may be mounted at various locations on or in the perimeter frame 104 and/or the central frame 107. The power modules for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the UAV control system 114, the lifting motors 106, the thrusting motors 110, the landing gear assembly 150 and/or the payload engagement mechanism (not shown).

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module. In some implementations, rather than mounting or including the power modules on the perimeter frame 104 or the central frame 107, one or more power modules may be coupled to the landing gear assembly 150. In such an implementation, the landing gear assembly may be loaded with a payload and charged power modules to which the UAV may be coupled.

Figure 2:
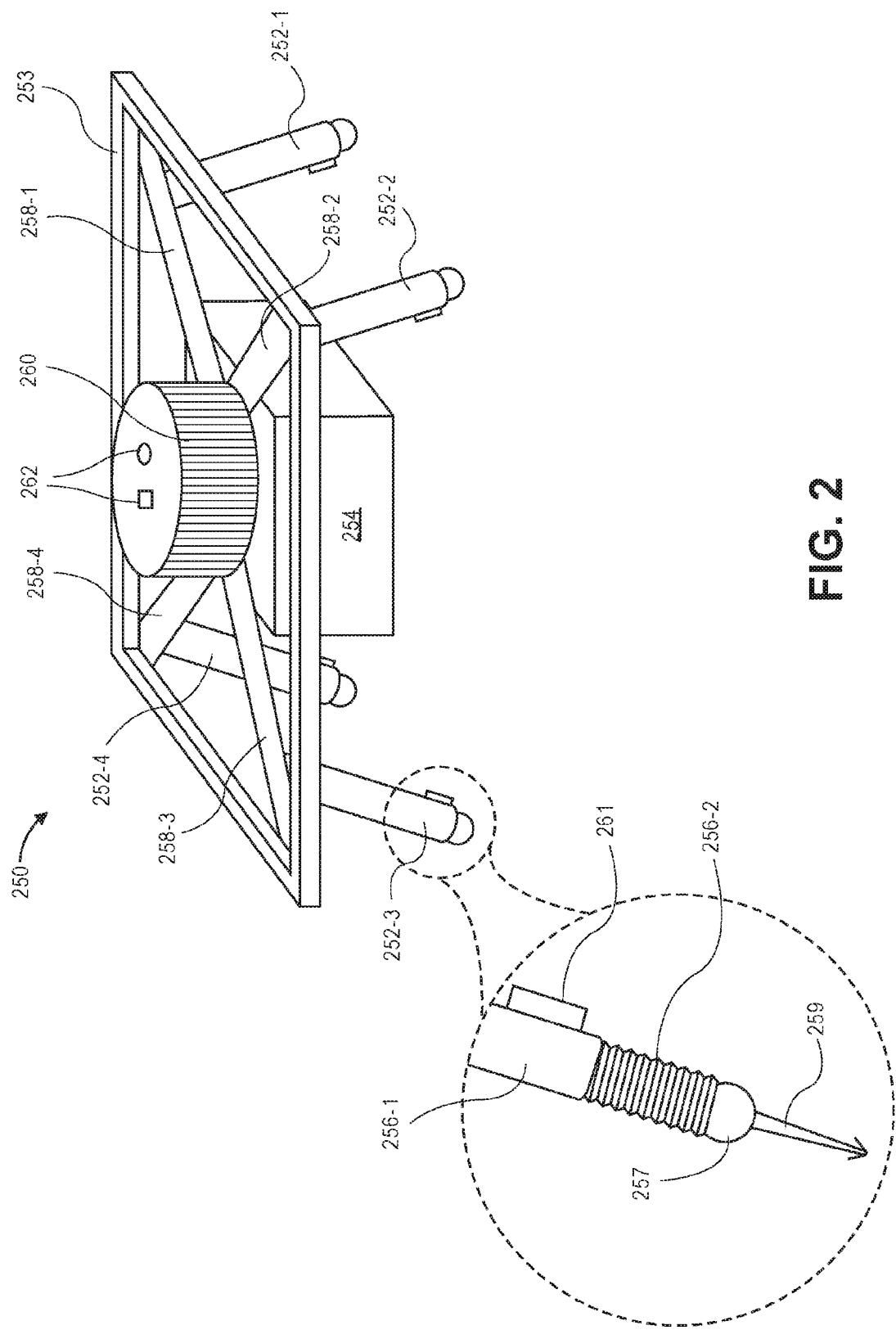
FIG. 2 depicts a view of a landing gear assembly for an unmanned aerial vehicle, according to an implementation.

FIG. 2 depicts a view of a landing gear assembly 250 for an unmanned aerial vehicle, according to an implementation. As mentioned above with respect to FIG. 1, the landing gear assembly 250 includes a main support base 253 and one or more landing gear extensions 252. In this example, the landing gear assembly includes four landing gear extensions 252-1, 252-2, 252-3, 252-4 that may be adjusted horizontally, or extended/contracted to adjust the angle of the body of the UAV when landed. Likewise, the angle of each landing gear extension with respect to the main support base may likewise be adjusted. In implementations with one landing gear extension, the landing gear extension may be adjustable, as described herein, and support a portion of the body of the UAV. In such an implementation, the one landing gear extension may have a base plate (discussed below) that is of a size sufficient to support the UAV when landed. In another configuration, the landing gear extension may support a portion of the body of the UAV and a second opposing portion of the body of the UAV may contact the surface. For example, the landing gear extension may be on one side of the body of the UAV and configured to extend or contract until the body of the UAV is approximately horizontal when the opposing side of the UAV is contacting the surface.

In implementations with two landing gear extensions, the base plates of each landing gear extension may be of a size sufficient to support the body of the UAV when landed and/or the two landing gear extensions may be positioned to support a portion of the body of the UAV while other portions of the body of the UAV contact the surface. In implementations with three landing gear extensions 252, the landing gear extensions may be arranged in a triangular fashion to enable support of the body of a UAV when the UAV is landed. In configurations with additional landing gear extensions, the landing gear extensions may be arranged to enable support of all or a portion of the body of the UAV when landed. Likewise, in some configurations, the body of the UAV may include one or more fixed or non-adjustable landing gear extensions and one or more adjustable landing gear extensions.

The landing gear extensions 252 are coupled to the main support base 253 and may be adjusted horizontally along the support arms 258. For example, each landing gear extension 252 may be adjustably coupled to a respective support arm. Each landing gear extension may be adjusted horizontally inward toward the center of the landing gear assembly 250 or adjusted horizontally outward along the support arm 258 to which it is coupled. The landing gear extensions may be coupled to the support arms 258 along rails, tracks or other movable components to facilitate horizontal adjustment. In this example, there are four support arms 258-1, 258-1, 258-3, 258-4 and each of the landing gear extensions 252-1, 252-2, 252-3, 252-4 are coupled to an underneath side of one of the support arms 258.

Each of the landing gear extensions 252 are also adjustable from a contracted position, as illustrated in FIG. 2, to an extended position. When in a fully contracted position, the landing gear extensions are at their shortest possible length as the adjustable portion of the landing gear extensions is contracted into a fixed portion of the landing gear extension. For example, referring to the expanded view of landing gear extension 252-3, the landing gear extension 252-3 includes an outer fixed portion 256-1 and an inner adjustable portion 256-2 that may be extended or contracted with respect to the fixed portion 256-1. In this example, the inner adjustable portion 256-2 is a threaded extension that mates with threads on an inner side of the fixed portion 256-1. When the adjustable portion is rotated in a first direction, the threads cause the adjustable portion 256-2 to extend from the fixed portion 256-1 so that the landing gear extension adjusts from a contracted position to an extended position. When the adjustable portion is rotated in a second direction, the threads cause the adjustable portion 256-2 to contract into the fixed portion 256-1, so that the landing gear extension is adjusted from an extended position to a contracted position. The adjustable portion may be coupled to and rotated by a motor, such as a servo motor.

The landing gear extensions may use any one or more mechanisms for contracting and extending the landing gear extension. For example, the landing gear extension may include a hydraulic arm, a pneumatic arm, a magnetically adjustable arm, threaded extensions as illustrated in FIG. 2, a linear gear extension, a telescoping arm, etc. In each configuration, the landing gear extension includes an appropriate drive or motor to facilitate adjustment of the landing gear extension. In some implementations, the landing gear extensions may be configured such that the adjustable portion of the landing gear extension may be separated or ejected from the landing gear extension. For example, if the UAV is landed and preparing to liftoff, it may be determined that one or more of the landing gear extensions has malfunctioned and/or the adjustable portion of the landing gear extension is stuck in the surface (e.g., mud or ice). In such an implementation, the adjustable portion of the landing gear extension may be ejected or otherwise separated from the landing gear assembly to enable liftoff by the UAV.

Each landing gear extension may also include a base plate 257 that is positioned at the end or foot of the landing gear extension 252. The base plate 257 may be of any size and/or shape. For example, as illustrated in FIG. 2, the base plate 257 may have a substantially cylindrical shape to facilitate a firm contact with a sloping surface. In other implementations, the base plate 257 may have a large surface area to provide increased contact between the base plate 257 and the surface. In one implementation, there may only be two landing gear extensions and each landing gear extension may have a base plate with a large flat surface area that provides sufficient contact between the base plates and the surface to support the UAV. Likewise, in some implementations, the base plate may be rotatable about one or more axis with respect to the landing gear extension.

The base please 257 may also include one or more sensors, such as a contact sensor. The contact sensor may be positioned on a lower portion of the base plate 257 and configured to detect when the landing gear extension contacts a surface. The contact sensor may be any type of pressure sensor, load cell, etc., that is capable of detecting a contact with another object. The contact sensor may also be configured to detect a surface type and/or a surface material (e.g., earth, stone, composite roof, ice, metal). In other implementations, the surface type and/or surface material may be determined based on one or more images obtained of the surface that are processed to determine the surface type and/or surface material.

The base plate 257, in some implementations, may also include a surface engagement member, such as the surface engagement member 259 illustrated in FIG. 2. The surface engagement member may be configured to increase a contact between the landing gear extension 252 and the surface and/or to secure the landing gear extension 252 to the surface. Depending on the surface type and/or surface material, different surface engagement members 259 may be utilized. For example, as illustrated in FIG. 2, the surface engagement member 259 may be in the form of a barbed spike that may be extended or contracted from the base pate 257 to secure the landing gear extension 252 to a surface. The surface engagement member 259 illustrated in FIG. 2 may be utilized when the UAV is landed on an earth surface to secure the landing gear extension 252 to the earth. Likewise, if the UAV is landed on ice, snow, or other similar material, the surface engagement member 259 illustrated in FIG. 2 may likewise be extended from the base plate 257 to increase or secure the landing gear extension 252 to the surface. In other implementations, other forms of surface engagement members may be utilized. For example, rather than a barbed spike, the surface engagement member may be in the form of a barbless spike and/or a threaded screw that may be rotated and screwed into the surface. As another example, one or more of the landing gear extensions 252 may include a surface engagement member in the form of a magnet or electromagnet for securing the landing gear extension 252 to a metallic surface. In still another example, one or more of the landing gear extensions may include a surface engagement member in the form of a vacuum suction cup that may be engaged to secure the landing gear extension 252 to a flat surface. In some implementations, one or more of the landing gear extensions 252 of a landing gear assembly 250 may include the same or different types of surface engagement members 259.

One or more of the landing gear extensions may also include a distance determining element 261 that is configured to determine a distance between the distance determining element and an object, such as a surface. The distance determining elements 261 may be any form of device that can be used to measure a distance between an object and the distance determining element. For example, the distance determining elements 261 may be any one of an ultrasonic ranging module, a laser rangefinder, a radar distance measurement module, a stadiametric based rangefinder, a parallax based rangefinder, a coincidence based rangefinder, a Lidar based rangefinder, Sonar based range finder, or a time-of-flight based rangefinder. In some implementations, different distance determining elements may be utilized on the UAV and/or the landing gear assembly.

As discussed further below, the determined distances between each of the landing gear extensions and/or the detected contact of a landing gear extension with an object may be provided to a landing gear controller. The landing gear controller may determine a slope of a surface on which the UAV will land and send instructions to adjust (expand/contract) one or more of the landing gear extensions so that the body of the UAV remains horizontal when the UAV is landed.

Coupled to an upper side of the main support base may be a support coupling 260 that enables the landing gear assembly to be selectively coupled or decoupled from a body of a UAV, such as the UAV 100 discussed above with respect to FIG. 1. For example, the support coupling may have one or more grooves, ridges or attachment locations to which a receiver coupling that is mounted to an underneath side of the body of a UAV can couple. For example, a receiver coupling may be mounted to an underneath side of the hub 108 of the central frame 107 of the UAV 100 (FIG. 1) and the support coupling may be configured to couple with the receiver coupling.

The support coupling may include one or input/output contacts 262 that may be utilized to exchange data between the landing gear assembly and the UAV control system 114, to provide power from a power module of the UAV to the landing gear assembly 250, to provide power from a power module of the landing gear assembly to the UAV, and/or to provide other materials such as liquid and/or gas that may be used to operate one or more of the landing gear extensions 252. For example, if the landing gear extension 252 includes a hydraulic arm, a liquid may be provided from a liquid storage reservoir mounted to a body of the UAV through one of the input/output contacts 262 and used to adjust the landing gear extension 252. In other implementations, the liquid, gas, or other material(s) used to adjust the landing gear extensions may be included as part of the landing gear assembly, or contained in the respective landing gear extension.

In some implementations, the support coupling 260 may be rotatable about one or more axis. For example, the support coupling 260 may include a gimbal or other rotatable component. When the UAV is landed, the support coupling may be used to rotate the body of the UAV about an axis while the landing gear assembly remains stationary. Allowing rotation of the body of the UAV enables the UAV to orient in the approximate direction of a desired heading of the UAV before the UAV lifts off from the surface. This may be particularly desirable when the UAV includes one or more wings. By orienting the UAV in the desired heading, for example into the wind, the UAV remains more stable during liftoff.

When the UAV is airborne, the support coupling may be used to rotate the landing gear assembly about an axis without rotating the body of the UAV. Allowing rotation of the landing gear assembly allows the UAV to position the landing gear assembly and position the landing gear extensions at orientations that will engage the surface at desired points and provide the greatest stability for the UAV while landed. Rather than having to reorient the UAV, which may result in undesired crosswinds, etc., the landing gear assembly may be rotated using the support coupling.

While the examples herein discuss a landing gear assembly that may be coupled and decoupled from a body of a UAV, in other configurations, the landing gear assembly may be incorporated into a part of the UAV.

As mentioned above, the landing gear assembly 250 may also include a payload engagement mechanism that is configured to engage and disengage a payload 254, such as items and/or containers that hold items. In this example, the payload engagement mechanism is positioned beneath and coupled to an underneath side of the support arms 258 and the support coupling 260. The payload engagement mechanism may be of any size sufficient to securely engage and disengage a payload 254. In other implementations, the payload engagement mechanism may operate as the container in which it contains item(s). The payload engagement mechanism communicates with (via wired or wireless communication) and is controlled by the UAV control system 114. For example, the UAV control system 114 may send instructions to the payload engagement mechanism via the input/output contacts 262. Example payload engagement mechanisms are described in co-pending patent application Ser. No. 14/502,707, filed Sep. 30, 2014, titled "UNMANNED AERIAL VEHICLE DELIVERY SYSTEM," the subject matter of which is incorporated by reference herein in its entirety.

With the implementations described herein, the landing gear assembly, when coupled to a UAV, allows the UAV to land on sloping and/or uneven surfaces while keeping the body of the UAV horizontal. When the UAV is horizontal, one or more components of the UAV control system 114 may be calibrated so that the UAV operates in an efficient and safe manner.

Establishing horizontal may be done at a variety of times. For example, when the UAV first powers on, it may engage the landing gear assembly and adjust one or more of the landing gear extensions until it is determined that the body of the UAV is horizontal. It may be determined that the body of the UAV is horizontal using one or more sensors. The sensors may be any type of sensor that can be configured to determine an angle or whether the body of the UAV is horizontal. For example, the sensor may be an accelerometer, an inclinometer, a manometer, a mechanical level, etc. In one implementation, a measurement unit, one or more components (e.g., navigation system) of the UAV control system, and/or one or more other points of reference may be utilized to determine when the body of the UAV is approximately horizontal. For example, rather than the entire body of the UAV being horizontal, the landing gear assembly may be adjusted until the measurement unit, component(s) of the UAV control system, and/or other point of reference is approximately horizontal. When the measurement unit, component(s), and/or other point of reference is approximately horizontal, the body of the UAV is considered to be horizontal. Once it is determined that the body of the UAV is horizontal, the flight system may be calibrated.

Figure 3:
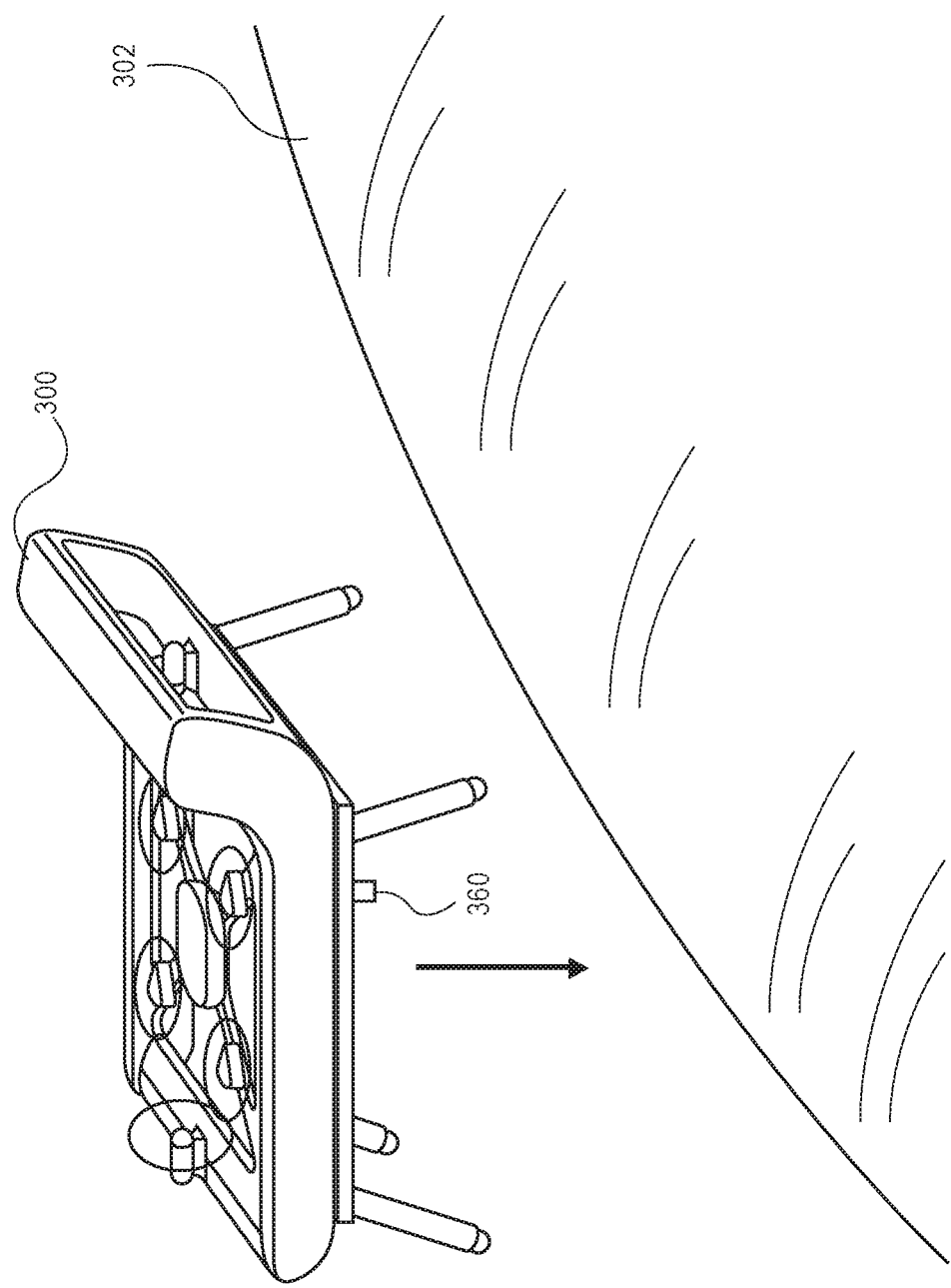
FIG. 3 illustrates an unmanned aerial vehicle preparing to land on a sloping surface, according to an implementation.
Figure 4:
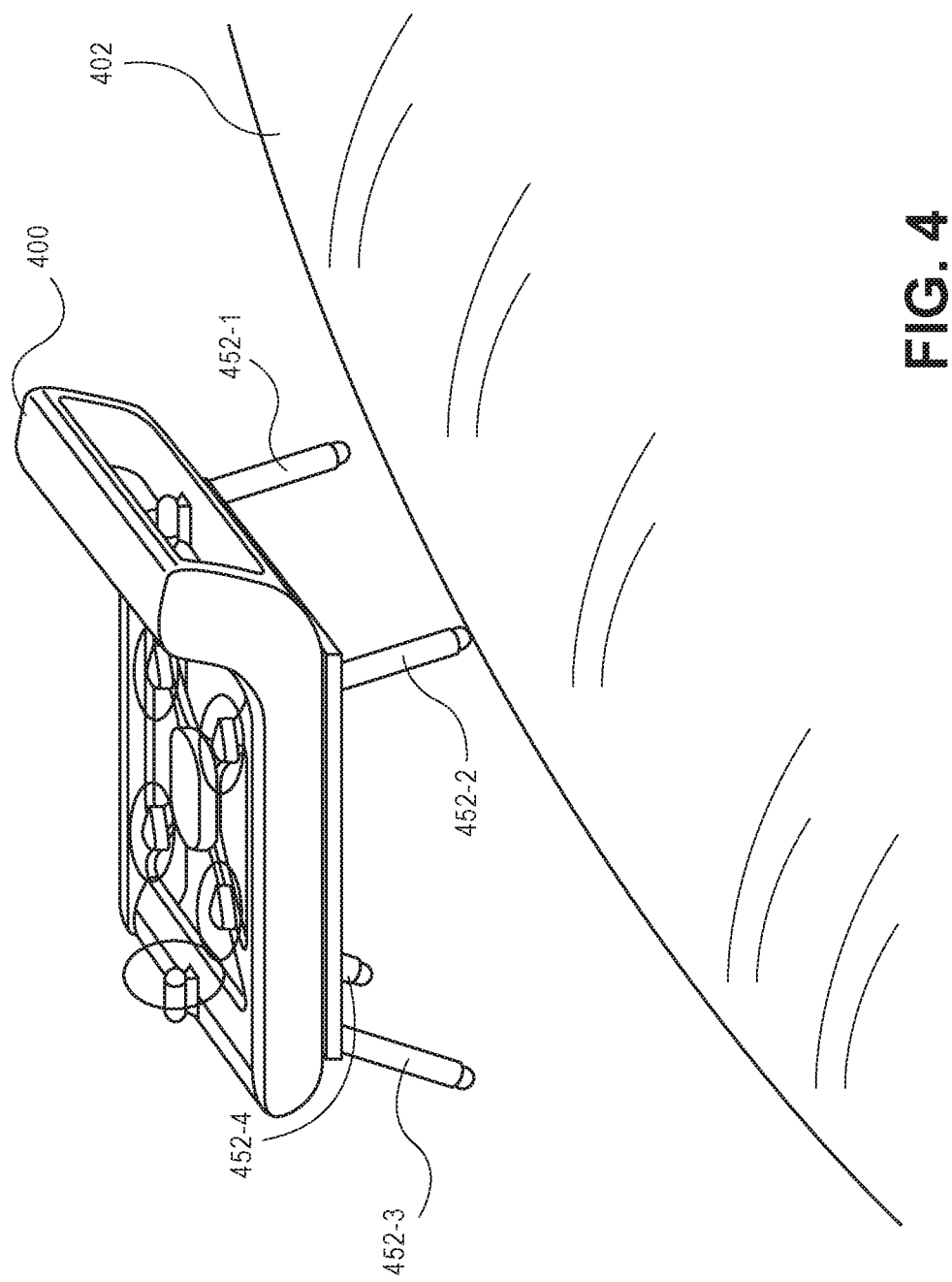
FIG. 4 illustrates an unmanned aerial vehicle landing on a sloping surface, according to an implementation.
Figure 5:
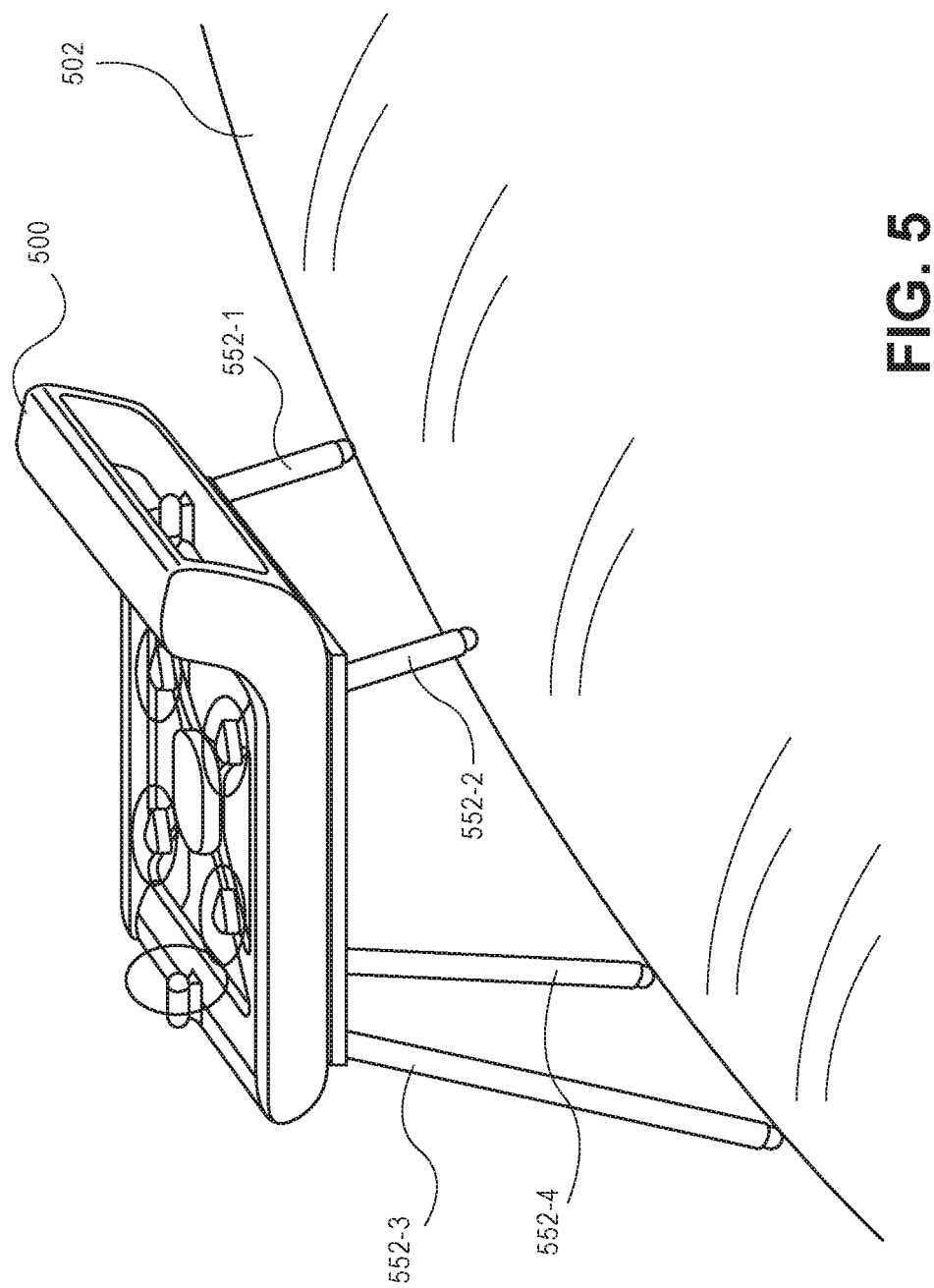
FIG. 5 illustrates an unmanned aerial vehicle landed on a sloping surface, according to an implementation.

In another implementation, as illustrated in FIGS. 3-5, as a UAV is landing, it may determine a slope of the surface upon which it will land and extend or contract one or more of the landing gear extensions so that the body of the UAV will be horizontal when the UAV contacts the surface.

Referring first to FIG. 3, which illustrates an unmanned aerial vehicle 300 preparing to land on a sloping surface, according to an implementation, one or more distance determining elements 360 of the UAV may be used to determine a slope of the surface. In this example, the UAV and/or the landing gear assembly includes a distance determining element 360 in the form of an ultrasonic sensor that is configured to measure the distance at several points between the distance determining element and the surface. Based on the measured distances, the landing gear controller determines an approximate slope or topology of the surface and determines which landing gear extensions need to be extended or contracted so that the body of the UAV remains approximately horizontal after the UAV has landed on the sloping surface.

Figure 6:
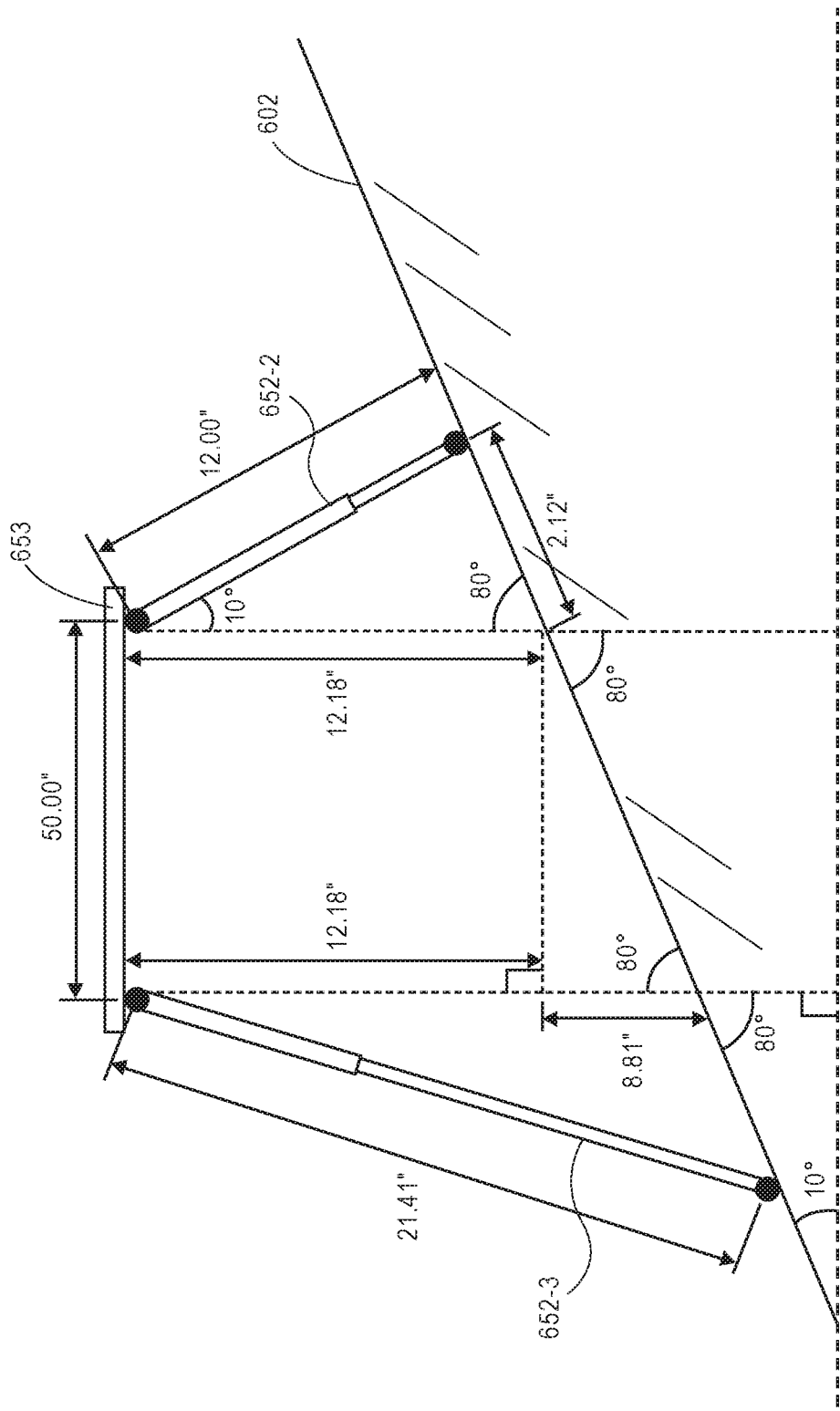
FIG. 6 illustrates a landing gear assembly positioned on a surface, according to an implementation.

For example, referring to FIG. 6, if the surface 602 has approximately a ten degree slope, the landing gear controller can determine that if the landing gear extension 652-3 is contracted to a length of approximately 12.00 inches and has an angle of 100 degrees with respect to the main support base 653 (or ten degrees past vertical), the landing gear controller can compute and determine the length and angles for the other landing gear extensions that are needed so that the main support base 653 is approximately horizontal. In this example, if the distance between the first landing gear extension 652-2 and the second landing gear extension is approximately 50.00 inches, it can be computed that the second landing gear extension 652-3 should have an angle of approximately 95 degrees with respect to the main support base 653 (five degrees past vertical) and a length of approximately 21.41 inches. A similar computation may be used to determine the angle and length of other landing gear extensions.

Based on the computed angles and lengths of the landing gear extensions, the landing gear controller sends instructions to each landing gear extension to extend or contract to the determined length and position the landing gear extension at the determined angle. Adjustments to the landing gear extensions may be done prior to the UAV contacting the surface so that the landing gear extensions are at approximately the appropriate lengths, after contact between a landing gear extension and the surface is detected, or after the UAV has landed. In one implementation, the landing gear extensions are adjusted to the appropriate lengths and angles prior to landing and, once the UAV has landed, any final adjustments to the lengths of the landing gear extensions may be made so that the main support base and the body of the UAV 300 are approximately horizontal. Once the body of the UAV is determined to be horizontal, the UAV may power down, calibrate the UAV control system, and/or perform other functions.

FIG. 4 illustrates another example for adjusting a UAV 400 utilizing the landing gear extensions 452, according to an implementation. In this example, the ends of the landing gear extensions 452 that contact the surface 402 each include contact sensors configured to detect when the landing gear extension has contacted the surface. As the UAV 400 descends toward the surface, the landing gear extensions are each maintained in a contracted or partially contracted position. The UAV continues to descend until a first landing gear extension 452-2 detects a contact between the landing gear extension 452-2 and the surface 402. When contact is detected, the UAV control systems continue to operate the motors and propellers of the UAV to keep the body of the UAV approximately horizontal. Likewise, the landing gear controller adjusts the landing gear extensions until contact with the other landing gear extensions and the surface are detected. In this example, the landing gear controller adjusts landing gear extensions 452-1, 452-3, 452-4 until each contact the surface 402. Once contact between the surface and each landing gear extension is detected, the UAV control system may power down the motors. The landing gear controller may also make any final adjustments to the landing gear extensions until the body of the UAV is determined to be approximately horizontal.

While FIG. 4 describes an example of descending toward a surface with the landing gear extensions contracted and then extending the landing gear extensions once a first contact is detected, in another implementation, the UAV may descend toward a surface with the landing gear extensions either fully or partially extended. In such an example, the contact sensors may be used to monitor for a first contact between an extended landing gear extension and the surface. When a first contact is detected, the UAV control system continues to operate the motors and propellers of the UAV to keep the body of the UAV approximately horizontal and to continue descent of the UAV toward the surface. Likewise, the landing gear controller adjusts the landing gear extension that has contacted the surface by contracting the landing gear extension until a second contact between the surface and a second extended landing gear extension is detected. This process of descending and contracting the landing gear extensions continues until all of the landing gear extensions have contacted the surface and the body of the UAV is approximately horizontal.

FIG. 5 illustrates a UAV 500 landed on a sloping surface 502, according to an implementation. In this example, the UAV 500 has adjusted the landing gear extensions 552-1, 552-2, 552-3, 552-4 so that the UAV is approximately horizontal when landed and supported by the landing gear extensions 552. The adjustments may be performed using any of the techniques discussed herein. In this example, the landing gear extensions 552-1, 552-2 are contracted and have a first length and a first angle. The landing gear extensions 552-3, 552-4 have been adjusted to extended positions and have second lengths. As illustrated, the second length is greater than the first length. While this example shows the landing gear extensions 552-1, 552-2 in contracted positions each having a first length and the landing gear extensions 552-3, 552-4 each being in extended positions and each have a second length, it will be appreciated that each landing gear extension 552-1, 552-2, 552-3, 552-4 may each have different lengths and/or angles with respect to the main support surface of the landing gear assembly.

Figure 7:
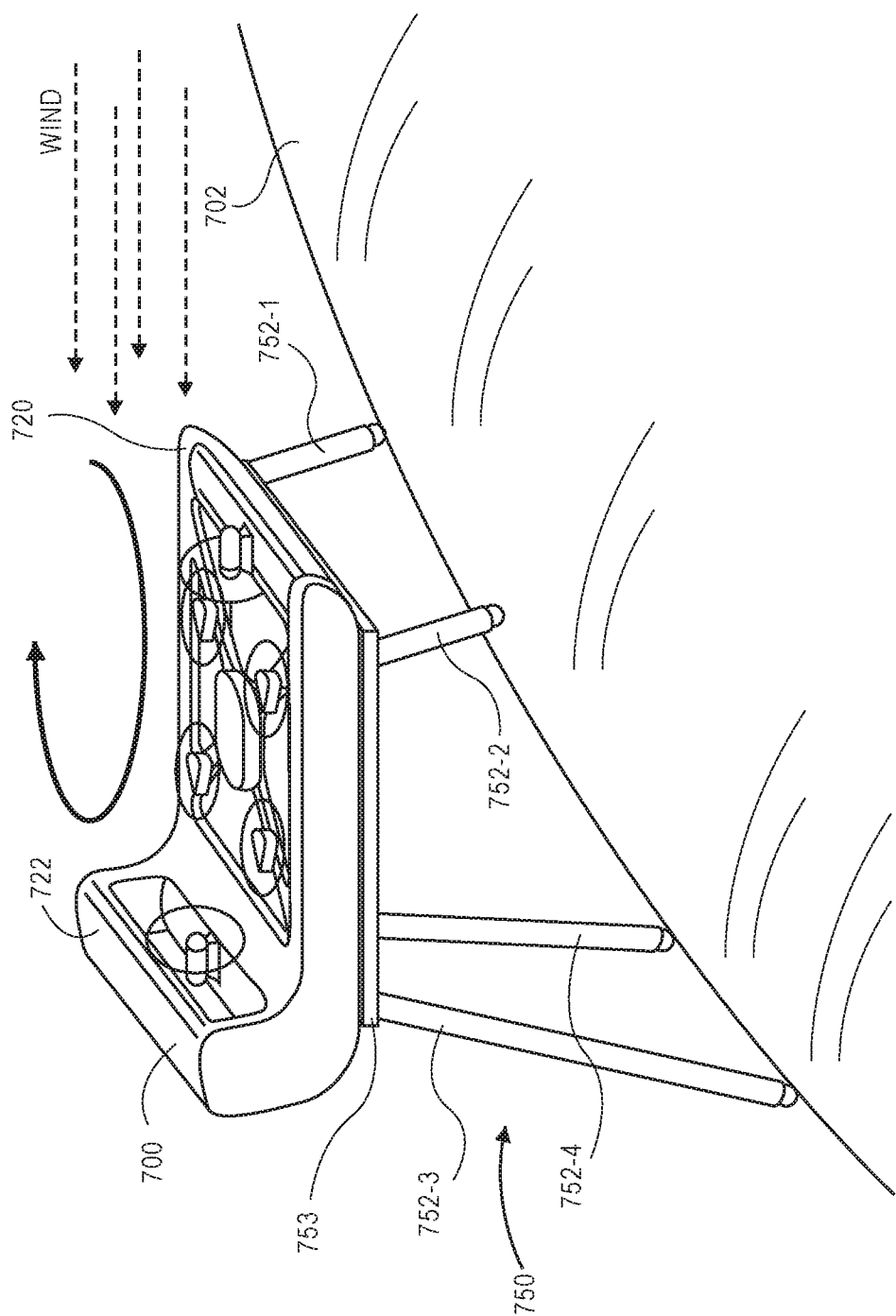
FIG. 7 illustrates an unmanned aerial vehicle preparing to liftoff, according to an implementation.

FIG. 7 illustrates a UAV preparing to liftoff from a surface 702, according to an implementation. In this example, the landing gear assembly 750 is coupled to the UAV 700 with a rotatable support coupling (not shown). Prior to liftoff, the UAV control system determines a desired heading of the UAV at liftoff. The desired heading may be based on, for example, the direction and speed of the wind, the planned flight path of the UAV, and/or other factors. In this example, because the UAV 700 includes wings 720, 722, it may be beneficial to orient the UAV 700 into the wind prior to liftoff so that the wind crossing over the wings 720, 722 will provide lift to the UAV and not cause undesired forces on the UAV.

Based on the desired heading of the UAV, the UAV 700 is rotated about an axis using the support coupling so that the UAV is oriented in the direction of the desired heading, as illustrated. As illustrated, the UAV 700 rotates about the axis while the UAV is landed, and the landing gear assembly 750 and corresponding landing gear extensions 752-1, 752-2, 752-3, 752-4 remain approximately stationary.

Figure 8:
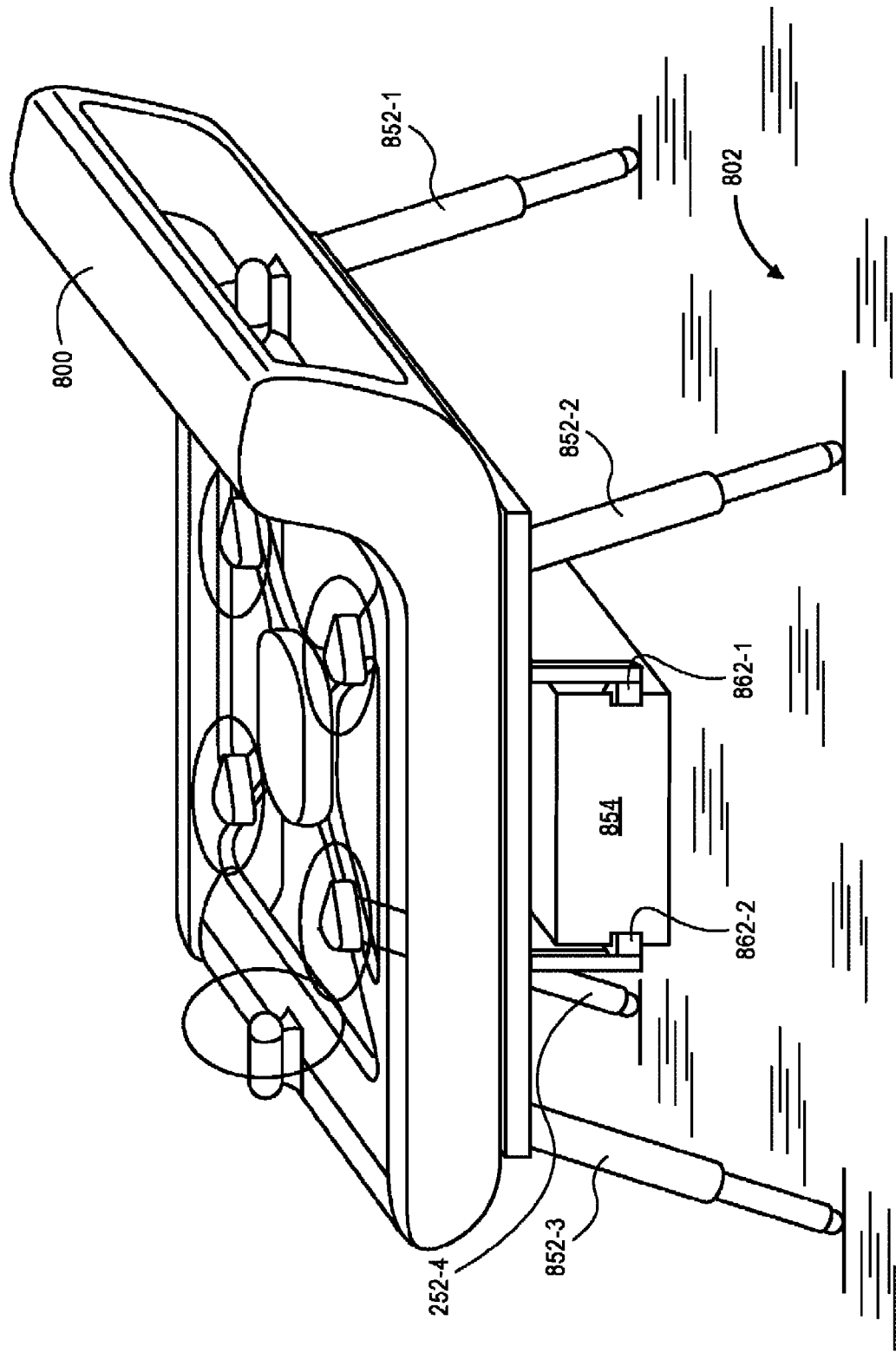
FIG. 8 illustrates an unmanned aerial vehicle landed on a surface, according to an implementation.

FIG. 8 illustrates a UAV 800 landed on a surface 802, according to an implementation. In this example, the landing gear extensions 852-1, 852-2, 852-3, 852-4 are positioned in an extended, or partially extended position prior to landing and configured to compress as the UAV 800 lands to absorb shock forces resultant from the landing. For example, if the landing gear extensions are hydraulic, the landing gear extensions may be configured to release or expel an amount of fluid when the UAV lands so that the landing gear extensions 852 effectively act as shock absorbers dampening the impact from landing. Using the landing gear extensions to absorb forces caused at landing, the UAV 800 and any engaged payload 854 receives less impact from the landing. By reducing forces affecting the payload 854, the UAV may be utilized to deliver fragile items, such as glass, without damaging the items during landing.

In addition to absorbing shock forces from the landing, the landing gear extensions are extended to a length so that the payload 854, which is engaged by the payload engagement mechanism 862 will not contact the surface 802 when the UAV 800 lands.

Figure 9:
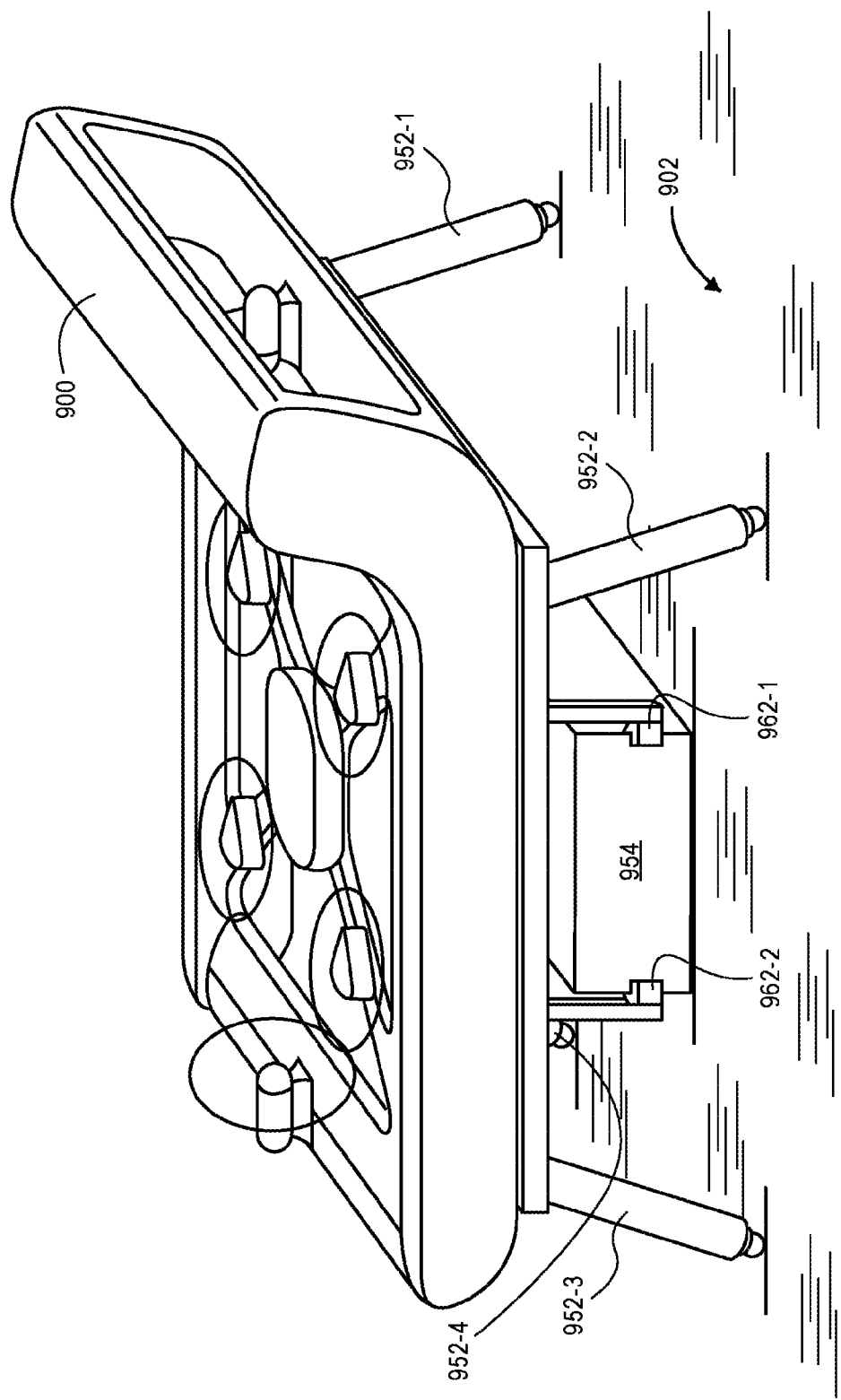
FIG. 9 illustrates an unmanned aerial vehicle landed on a surface and disengaging a payload, according to an implementation.

Turning to FIG. 9, illustrated is a UAV 900 landed on a surface 902 and disengaging a payload 954, according to an implementation. After the UAV has landed, the landing gear controller may cause the landing gear extensions 952-1, 952-2, 952-3, 952-4 to contract until the payload 954 contacts the surface or is a defined distance (e.g., 0.5 inches) above the surface 902. Contact between the payload 954 and the surface 902, or detecting the defined distance there between, may be done in a variety of manners. For example, the payload engagement mechanism 962 may include distance determining elements that can determine a distance from the surface. In other implementations, the payload engagement mechanism may detect a change in force when the payload 954 contacts the surface. In still another example, the contact sensors included in the landing gear extensions 952 may detect a change in pressure resulting from the payload contacting the surface.

Upon determining that the payload has contacted the surface and/or is positioned a defined distance above the surface, the payload may be disengaged by the payload engagement mechanism 962 such that the payload is disengaged from the UAV 900, thereby delivering the payload. After disengaging the payload, the landing gear controller may cause the landing gear extensions to extend to create a separation between the payload engagement mechanism 962 and the payload 954. Likewise, the UAV control system may cause the UAV 900 to liftoff, or perform other functions.

Figure 10:
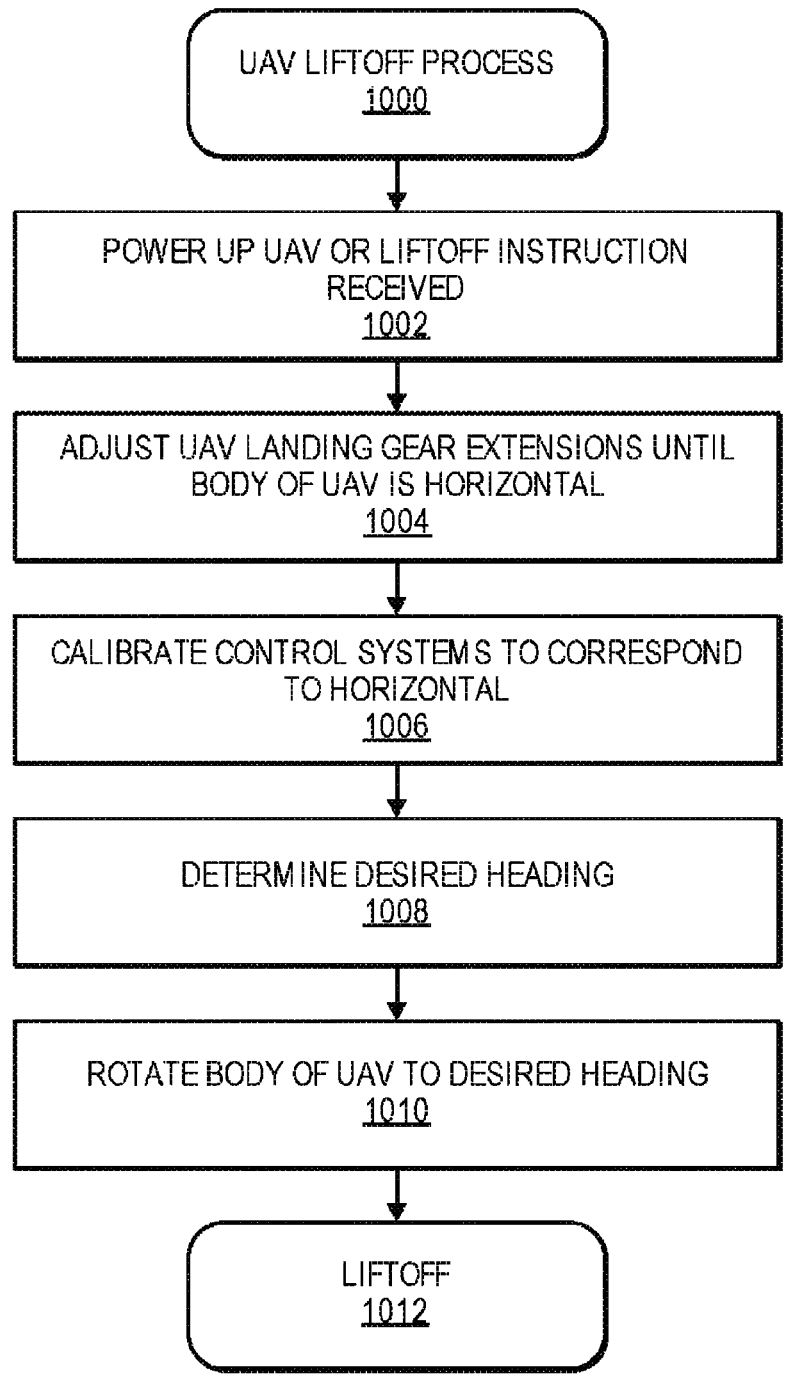
FIG. 10 is a flow diagram of an example unmanned aerial vehicle liftoff process, according to an implementation.

FIG. 10 is a flow diagram of an example unmanned aerial vehicle liftoff process 1000, according to an implementation. The example process 1000, and each other process described herein, may be implemented by the architectures described herein or by other architectures. The processes are illustrated as a collection of blocks in logical flow graphs. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 1000 begins when the UAV is powered up, or receives a liftoff instruction, as in 1002. For example, after a UAV has completed a delivery of a payload, it may receive instructions, which include a liftoff instruction, to navigate to another destination. As another example, if the UAV has been charging, it may be scheduled to power up and depart at a defined period of time or after charging of the power modules of the UAV is complete.

As part of the example process 1000, the UAV landing gear controller may determine if the UAV is horizontal and adjust one or more of the landing gear extensions until it is determined that the body of the UAV is approximately horizontal, as in 1004. For example, if it is determined that the body of the UAV is at an angle, one or more of the landing gear extensions may be expanded while others are contracted until the body of the UAV is horizontal.

Once the body of the UAV is horizontal, the one or more components of the UAV control system, such as an inertial measurement unit ("IMU"), is calibrated so that it corresponds with the determined horizontal position of the body of the UAV, as in 1006. Calibration of components is known to those of skill in the art and will not be discussed in detail herein.

In addition to calibrating components of the UAV control system, the desired heading of the UAV at liftoff is determined, as in 1008. The desired heading may be determined based on the direction of the wind and/or the wind speed, the intended flight path of the UAV, etc. Based on the determined desired heading of the UAV at liftoff, the body of the UAV is rotated about an axis so that it is oriented in the direction of the desired heading, as in 1010. For UAVs in which the direction or orientation is not important (e.g., UAV with no wings), blocks 1008-1010 may be omitted. However, for UAVs that have an orientation (e.g., UAV with wings), rotating the UAV to correspond with the desired heading may be beneficial for ensuring a stable liftoff and/or to improve efficiency of the UAV. As discussed above, the body of the UAV may be coupled to the landing gear assembly at a support coupling that enables the body of the UAV to rotate about an axis while the landing gear assembly remains stationary. After orienting the UAV to correspond with the desired heading, the UAV may liftoff, as in 1012.

Figure 11:
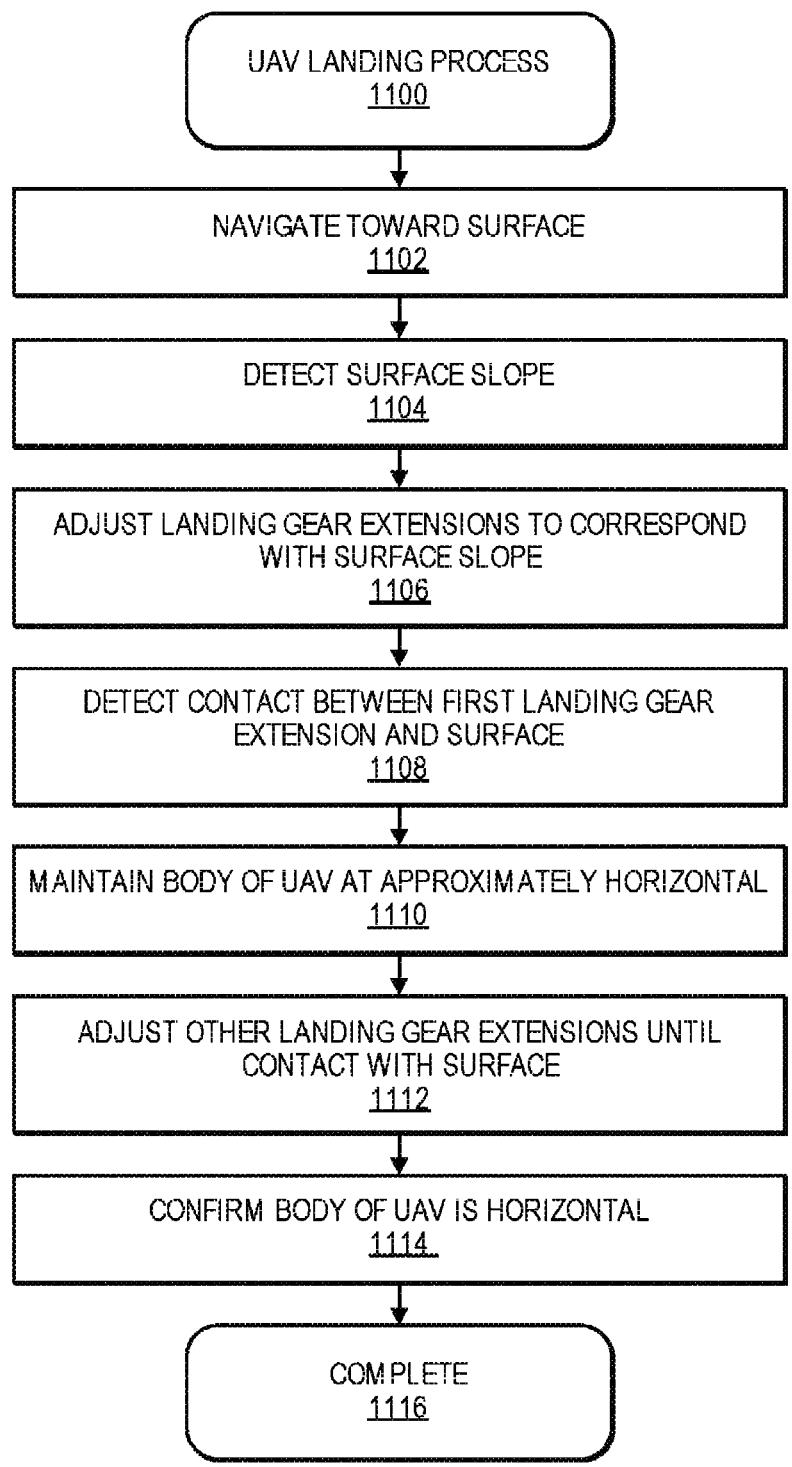
FIG. 11 is a flow diagram of an example unmanned aerial vehicle landing process, according to an implementation.

FIG. 11 is a flow diagram of an example UAV landing process 1100, according to an implementation. The example process 1100 begins by navigating the UAV toward a surface, as in 1102. As the UAV is approaching the surface, the slope of the surface is determined, as in 1104. As discussed above, the UAV and/or the landing gear assembly may include a distance determining element that is configured to measure distances between the UAV and the surface. The measured distances may be utilized to determine the slope of the surface.

Based on the determined slope of the surface upon which the UAV will land, one or more of the landing gear extensions are adjusted by either contracting or extending the landing gear extensions so that the landing gear extensions correspond with the surface slope, as in 1106. For example, as discussed above with respect to FIG. 6, a length and angle of one of the landing gear extensions may be set and the length and angle of the other landing gear extensions may be computed based on the determined slope of the surface so that the body of the UAV will remain approximately horizontal when the UAV lands on the surface.

As the UAV descends, contact between one or more of the landing gear extensions and the surface is determined, as in 1108. For example, as discussed above, the landing gear extensions may include contact sensors that detect contact between the landing gear extension and the surface. In another implementation, contact may be detected by the UAV control system due to a change in force or detected impact resulting from the contact between the landing gear extension and the surface.

When one or more of the landing gear extensions contact the surface, the UAV control system continues operating the motors and maintains the body at an approximately horizontal position, as in 1110. While the body of the UAV remains approximately horizontal, the landing gear extensions are adjusted until all the landing gear extensions are in contact with the surface and the body of the UAV is horizontal, as in 1112.

After landing, it is confirmed that the body of the UAV is horizontal, as in 114, and any additional adjustments to one or more of the landing gear extensions are made until the body of the UAV is approximately horizontal. Once it is confirmed that the body of the UAV is approximately horizontal, the example process 1100 completes, as in 1116.

The example process 1100 provides one implementation for adjusting the landing gear extensions during landing of the UAV so that the body of the UAV remains horizontal when landed and supported by the landing gear assembly. It will be appreciated that other techniques may likewise be utilized. For example, rather than detecting a slope of the surface and/or adjusting the landing gear extensions while landing, the UAV may land and then one or more of the landing gear extensions may be adjusted until the body of the UAV is determined to be horizontal. In another example, the example process may not determine the slope of the surface and may just monitor for a contact between one or more of the landing gear extensions, as discussed above with respect to block 1108. Once contact is detected, as in 1108, the remainder of the example process 1100 may be performed. In yet another example, the surface slope may be detected (1104) and the landing gear extensions adjusted to correspond with the surface slope (1106). However, rather than detecting contact (1108) and maintaining the body of the UAV at approximately horizontal (1110) while further landing gear extension adjustments are made (1112), the UAV may land, then confirm that the body of UAV is approximately horizontal and make any final adjustments to the landing gear extensions after landing.

Figure 12:
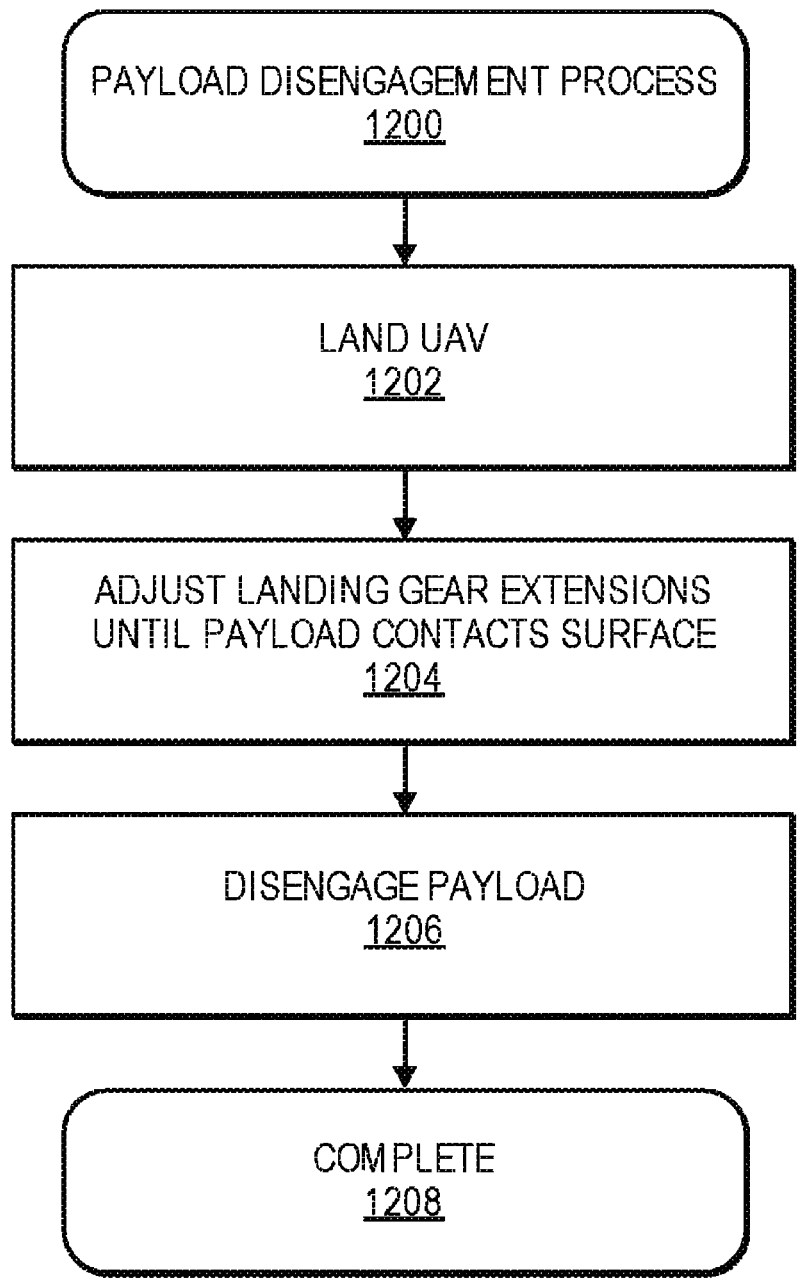
FIG. 12 is a flow diagram of an example unmanned aerial vehicle payload disengagement process, according to an implementation.

FIG. 12 is a flow diagram of an example UAV payload disengagement process 1200, according to an implementation. The example process begins by landing a UAV that includes a payload, as in 1202. As discussed above with respect to FIG. 8, in some implementations, the landing gear extensions may be adjusted so that the payload will not contact the surface when the UAV lands. Likewise, the landing gear extensions may be configured to absorb some or all of the forces resultant from the landing.

Once the UAV has landed, the landing gear extensions may be adjusted until the payload contacts the surface or is within a defined distance (e.g., 0.5 inches) from the surface, as in 1204. For example, the landing gear extensions may each contract a defined amount, effectively lowering the payload (and the UAV) closer to the surface.

Once the payload has contacted the surface or is within the defined distance of the surface, the payload is disengaged, as in 1206. For example, if the payload engagement mechanism includes a servo motor that controls arms that selectively engage or disengage a payload, the servomotor may cause the arms to disengage the payload. Upon disengagement of the payload from the UAV, the example process 1200 completes, as in 1208.

Figure 13:
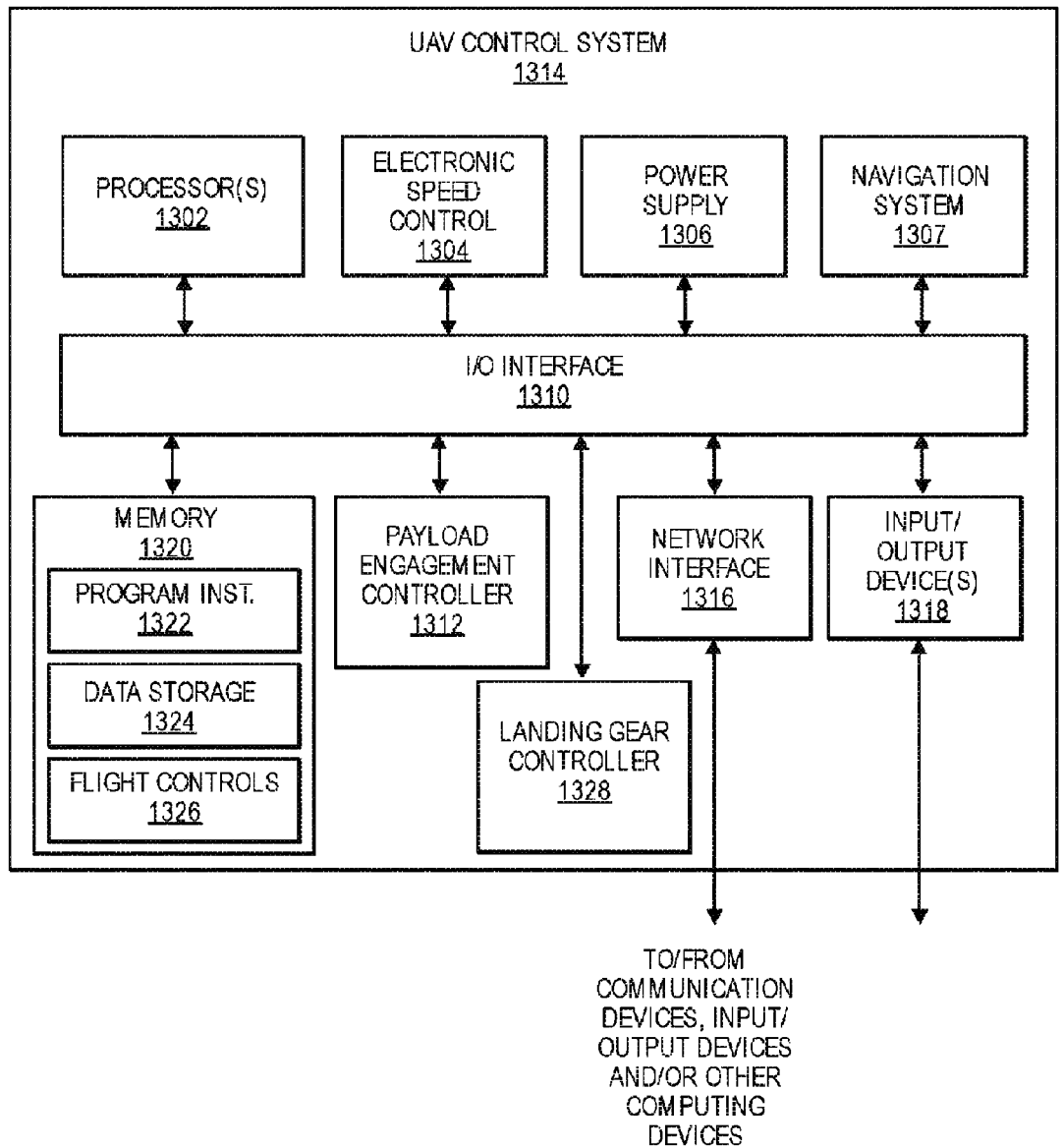
FIG. 13 is a block diagram of an illustrative implementation of an unmanned aerial vehicle control system that may be used with various implementations.

FIG. 13 is a block diagram illustrating an example UAV control system 1314. In various examples, the block diagram may be illustrative of one or more aspects of the UAV control system 114 that may be used to implement the various systems and methods discussed herein and/or to control operation of the UAVs described herein. In the illustrated implementation, the UAV control system 1314 includes one or more processors 1302, coupled to a memory, e.g., a non-transitory computer readable storage medium 1320, via an input/output (I/O) interface 1310. The UAV control system 1314 may also include electronic speed controls 1304 (ESCs), power supply modules 1306, a navigation system 1307, a payload engagement controller 1312, and/or a landing gear controller 1328. In some implementations, the navigation system 1307 may include an IMU. The UAV control system 1314 may also include a network interface 1316, and one or more input/output devices 1318.

In various implementations, the UAV control system 1314 may be a uniprocessor system including one processor 1302, or a multiprocessor system including several processors 1302 (e.g., two, four, eight, or another suitable number). The processor(s) 1302 may be any suitable processor capable of executing instructions. For example, in various implementations, the processor(s) 1302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1302 may commonly, but not necessarily, implement the same ISA.

The landing gear controller 1328 may communicate with the landing gear assembly sending instructions to adjust the landing gear extensions. In some implementations, the landing gear controller may also include a device that may be used to determine if the body of the UAV is approximately horizontal. For example, the landing gear controller may include a digital level, an accelerometer, a gyroscope, or other component that can measure or determine an angle or tilt of an object. In other implementations, the landing gear controller may receive information from the navigation system 1307 indicating whether the body of the UAV is horizontal.

In other implementations, the landing gear controller may not be included in the UAV control system and may be part of the landing gear assembly. In such an implementation, the landing gear controller may communicate with the UAV control system via wired and/or wireless communication.

The non-transitory computer readable storage medium 1320 may be configured to store executable instructions, data, flight paths, flight control parameters, and/or data items accessible by the processor(s) 1302. In various implementations, the non-transitory computer readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1320 as program instructions 1322, data storage 1324 and flight controls 1326, respectively. In other implementations, program instructions, data, and/or flight controls may be received, sent, or stored upon different types of computer-accessible media, such as non-transitory media, or on similar media separate from the non-transitory computer readable storage medium 1320 or the UAV control system 1314. Generally speaking, a non-transitory, computer readable storage medium may include storage media or memory media such as magnetic or optical media, e.g., disk or CD/DVD-ROM, coupled to the UAV control system 1314 via the I/O interface 1310. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1316.

In one implementation, the I/O interface 1310 may be configured to coordinate I/O traffic between the processor(s) 1302, the non-transitory computer readable storage medium 1320, and any peripheral devices, the network interface 1316 or other peripheral interfaces, such as input/output devices 1318 and/or the landing gear controller, if it is separate from the UAV control system. In some implementations, the I/O interface 1310 may perform any necessary protocol, timing or other data transformations to convert data signals from one component (e.g., non-transitory computer readable storage medium 1320) into a format suitable for use by another component (e.g., processor(s) 1302). In some implementations, the I/O interface 1310 may include support for devices attached through various types of peripheral buses, such as a variant of the Peripheral Component Interconnect (PCI) bus standard or the Universal Serial Bus (USB) standard, for example. In some implementations, the function of the I/O interface 1310 may be split into two or more separate components, such as a north bridge and a south bridge, for example. Also, in some implementations, some or all of the functionality of the I/O interface 1310, such as an interface to the non-transitory computer readable storage medium 1320, may be incorporated directly into the processor(s) 1302.

The ESCs 1304 communicate with the navigation system 1307 and adjust the rotational speed of each lifting motor and/or the thrusting motor to stabilize the UAV and guide the UAV along a determined flight path. The navigation system 1307 may include a GPS, indoor positioning system (IPS), IMU or other similar systems and/or sensors that can be used to navigate the UAV 100 to and/or from a location. The payload engagement controller 1312 communicates with actuator(s) or motor(s) (e.g., a servomotor) used to engage and/or disengage items.

The network interface 1316 may be configured to allow data to be exchanged between the UAV control system 1314, other devices attached to a network, such as other computer systems (e.g., remote computing resources), and/or with UAV control systems of other UAVs. For example, the network interface 1316 may enable wireless communication between the UAV that includes the control system 1314 and a UAV control system that is implemented on one or more remote computing resources. For wireless communication, an antenna of an UAV or other communication components may be utilized. As another example, the network interface 1316 may enable wireless communication between numerous UAVs. In various implementations, the network interface 1316 may support communication via wireless general data networks, such as a Wi-Fi network. For example, the network interface 1316 may support communication via telecommunications networks, such as cellular communication networks, satellite networks, and the like.

Input/output devices 1318 may, in some implementations, include one or more displays, distance determining elements, imaging devices, thermal sensors, infrared sensors, time of flight sensors, accelerometers, pressure sensors, weather sensors, cameras, gimbals, etc. Multiple input/output devices 1318 may be present and controlled by the UAV control system 1314.

As shown in FIG. 13, the memory may include program instructions 1322, which may be configured to implement the example routines and/or sub-routines described herein. The data storage 1324 may include various data stores for maintaining data items that may be provided for determining flight paths, landing, identifying locations for disengaging payloads, engaging/disengaging the thrusting motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 1314 is merely illustrative and is not intended to limit the scope of the present disclosure. In particular, the computing system and devices may include any combination of hardware or software that can perform the indicated functions. The UAV control system 1314 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 1314. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 1314 may be transmitted to the UAV control system 1314 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An unmanned aerial vehicle ("UAV"), comprising:
a body;
a plurality of motors coupled to the body;
a support coupling configured to couple the body of the UAV and a landing gear assembly;
the landing gear assembly, including:
a plurality of landing gear extensions, each of the plurality of landing gear extensions contacting a surface and supporting at least a portion of the UAV, wherein at least a first landing gear extension of the plurality of landing gear extensions is adjustable by a landing gear controller between a first contracted position and a first extended position independently of others of the plurality of landing gear extensions; and
the landing gear controller configured to at least:
monitor an angle of at least a portion of the body of the UAV with respect to a plane that is approximately perpendicular to a gradient of a gravity field of earth at a position of the UAV; and
adjust at least the first landing gear extension until the at least a portion of the body of the UAV is approximately contained in the plane;
wherein the support coupling is further configured to enable rotation of the body of the UAV about an axis.

2. The UAV of claim 1, wherein at least the first landing gear extension includes at least one of a hydraulic arm, a pneumatic arm, a threaded extension, a magnetically adjustable arm, a linear gear extension, or a telescoping arm.

3. The UAV of claim 1, wherein the plurality of landing gear extensions further includes:
a second landing gear extension of the plurality of landing gear extensions that is adjustable by the landing gear controller between a second contracted position and a second extended position; and
a third landing gear extension of the plurality of landing gear extensions that is adjustable by the landing gear controller between a third contracted position and a third extended position.

4. The UAV of claim 1, further comprising:
a navigation component configured to control a flight of the UAV; and
wherein the navigation component is calibrated in response to a communication from the landing gear controller that the at least a portion of the UAV is contained within the plane.

5. A landing gear assembly for an unmanned aerial vehicle (UAV), comprising:
a plurality of landing gear extensions, each of the plurality of landing gear extensions coupled to and extending from the UAV, at least a first landing gear extension of the plurality of landing gear extensions adjustable by a landing gear controller between a first contracted position and a first extended position independently of others of the plurality of landing gear extensions; and
a support coupling configured to couple the plurality of landing gear extensions and a body of the UAV; and
wherein the landing gear controller adjusts at least the first landing gear extension so that the body of the UAV is approximately horizontal when landed on a surface, and
wherein the support coupling is further configured to enable rotation of the body of the UAV about an axis.

6. The landing gear assembly of claim 5, further comprising;
a main support base, the plurality of landing gear extensions being coupled to and extending from the main support base; and
wherein the support coupling is configured to selectively couple and decouple the main support base and the body of the UAV.

7. The landing gear assembly of claim 5, wherein the plurality of landing gear extensions further includes:
a second landing gear extension of the plurality of landing gear extensions that is adjustable by the landing gear controller between a second contracted position and a second extended position; and
a third landing gear extension of the plurality of landing gear extensions that is adjustable by the landing gear controller between a third contracted position and a third extended position.

8. The landing gear assembly of claim 5, wherein the support coupling includes a gimbal that enables the rotation of the body of the UAV about an axis.

9. The landing gear assembly of claim 5, further comprising:
a contact sensor coupled to the first landing gear extension configured to detect a contact between the first landing gear extension and the surface.

10. The landing gear assembly of claim 5, further comprising:
a distance determining element configured to measure a distance between the distance determining element and the surface.

11. The landing gear assembly of claim 10, wherein:
the measured distance is provided to the landing gear controller; and
the landing gear controller is configured to determine an amount to adjust at least the first landing gear extension based at least in part on the measured distance and a desired angle of the body of the UAV when the UAV is landed on the surface.

12. The landing gear assembly of claim 11, wherein the desired angle of the body of the UAV is approximately horizontal.

13. The landing gear assembly of claim 7, further comprising:
a first distance determining element coupled to the first landing gear extension and configured to measure a first distance between the first landing gear extension and the surface;
a second distance determining element coupled to the second landing gear extension and configured to measure a second distance between the second landing gear extension and the surface; and
a third distance determining element coupled to the third landing gear extension and configured to measure a third distance between the third landing gear extension and the surface.

14. A method to land an unmanned aerial vehicle ("UAV"), the method comprising:
  measuring, with at least one distance determining element, a slope of a surface; and
  extending a first landing gear extension of a plurality of landing gear extensions, independently of others of the plurality of landing gear extensions, from a first contracted position, in which the first landing gear extension has a first contracted length, to a first extended position, in which the first landing gear extension has a first extended length, wherein the first extended length is greater than the first contracted length;
  wherein:
    the plurality of landing gear extensions comprises at least a portion of a landing gear assembly, the landing gear assembly configured to couple to a body of the UAV via a support coupling;
    the support coupling is further configured to enable rotation of the body of the UAV about an axis; and
    the first extended length is based at least in part on the slope of the surface.

15. The method of claim 14, further comprising:
  detecting a contact between a second landing gear extension of the plurality of landing gear extensions and the surface; and
  wherein:
    the first landing gear extension is extended in response to the detected contact; and
    the first extended position is determined in response to the first landing gear extension contacting the surface.

16. The method of claim 14, further comprising:
  detecting a contact between a second landing gear extension of the plurality of landing gear extensions and the surface; and
  wherein:
    the first landing gear extension is extended in response to the detected contact; and
    the first extended position is determined so that at least a portion of the UAV is contained in a horizontal plane.

17. The method of claim 14, further comprising:
  extending a third landing gear extension of the plurality of landing gear extensions from a third contracted position, in which the third landing gear extension has a third contracted length, to a third extended position, in which the third landing gear extension has a third extended length, until the third landing gear extension contacts the surface.

18. The method of claim 14, further comprising:
  determining a desired heading of the UAV; and
  rotating the body of the UAV, via the support coupling and without rotating the landing gear assembly, about the axis to orient the body of the UAV in the desired heading.

19. The method of claim 14, further comprising:
  determining that the UAV has landed on the surface;
  contracting at least the first landing gear extension;
  determining that a payload of the UAV has contacted the surface; and
  disengaging the payload from the UAV.

* * * * *